May 28, 1963     C. DONALDSON     3,091,262

METAL-FIBER REINFORCED RESIN LAMINATE

Filed Aug. 19, 1957     2 Sheets-Sheet 1

INVENTOR
CHASE DONALDSON

BY *Ryfrad Semmes*

ATTORNEY

May 28, 1963     C. DONALDSON     3,091,262
METAL-FIBER REINFORCED RESIN LAMINATE
Filed Aug. 19, 1957     2 Sheets-Sheet 2
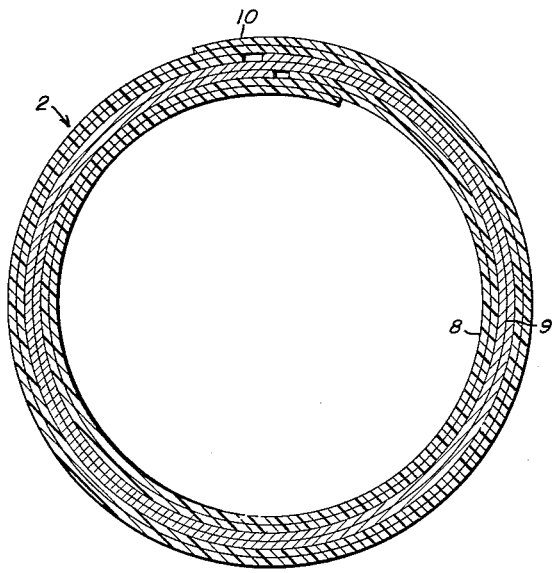
FIG. 3
     
FIG. 4     FIG. 5
*INVENTOR*
CHASE DONALDSON
BY
ATTORNEY ય
United States Patent Office 3,091,262
Patented May 28, 1963

3,091,262
METAL-FIBER REINFORCED RESIN LAMINATE
Chase Donaldson, Mount Vernon, N.Y., assignor to Darworth Incorporated, Simsbury, Conn., a corporation of Connecticut
Filed Aug. 19, 1957, Ser. No. 678,803
2 Claims. (Cl. 138—143)

This invention relates to reinforced laminated tubular articles. More particularly, it relates to reinforced tubular articles and a method for making the same from strips of thin metal to which have been secured reinforcing layers or elements of fiberglass, or from strips of thin metal secured to fiberglass reinforced and resin impregnated fibrous carrier webs.

Fiberglass has long been recognized as a means for reinforcing various products such as cloth and paper. Very little has been done, however, with respect to the use of fiberglass for the reinforcing of thin metallic sheets or strips employed in the making of tubular members primarily because of the difficulties involved in working with both fiberglass and thin metal sheets on conventional winding equipment.

It has been found, however, if various thin metal strips are first coated with suitable thermosetting resins which are in a tacky condition that the resins can be advantageously used to bind fiberglass strands, threads or yarns to the thin metal sheets. With the sheet then acting as a carrier for the fiberglass, it can be easily slit into strips which are subsequently wound into tubes. When the fiberglass reinforced metal strips are wound into tubular articles and subjected to heat, the resinous materials will then be cured and advantageously serve to hold the plies of the tubular articles together and further bind the fiberglass to the metal. By the use of fiberglass exceptionally thin metal sheets may be employed in making many tubular articles requiring great strength, such as hoop strength, or rigidity.

Accordingly, it is an object of this invention to provide a unique and simplified method for making tubular articles from thin sheets of metal reinforced with resin impregnated fiberglass alone or with resin impregnated fiberglass reinforced fibrous strips or tapes.

It is a further object of this invention to provide uniquely formed tubular articles comprised of alternate or successive laminae or plies of fiberglass and thin metal strips and wherein a resinous material is employed both to bind the several plies of the tubular articles together as well as the fiberglass to the thin metal strips.

It is a further object of this invention to provide unique tubular articles formed of thin strips of light metal such as aluminum foil or thin aluminum sheet reinforced with fiberglass secured thereto by resinous materials and with the strips being either convolutely or spirally wound into the tubular articles.

It is a further object of this invention to provide tubular articles formed of thin steel strips to which reinforcing fiberglass threads or yarn have been secured by resinous materials.

It is a further object of this invention to provide a unique method for forming multi-ply tubular articles of fiberglass and thin metal strips wherein the metal strips are so disposed with respect to the resin impregnated fiberglass layers, that the metal strips or layers will advantageously act as a mold form therefor during the curing of the resinous materials.

It is another object of this invention to provide a novel method for making tubular articles from windings of composite fiberglass and thin metal strips, wherein the resin employed to initially bind the fiberglass to the thin metal strips to allow simultaneous winding thereof is also advantageously employed after curing to hold the windings of the tubular articles together.

These and other objects of the instant invention will become more apparent from a review of the following detailed description, when taken in conjunction with the appended drawings wherein:

FIGURE 3 is a cross-sectional view of a multi-ply tubular article made according to the instant invention from both resin impregnated fiberglass and thin metal strips, wherein the metal in the article is also advantageously used as a mold form during the curing of the resin;

FIGURE 4 is a section of a composite strip shown as one of the windings in the tubular article of FIGURE 2 when taken along line 4—4 thereof and shows an alternate form of construction therefor; and FIGURE 5 is a sectional view taken along the line 5—5 of FIGURE 1.

Figure 1:
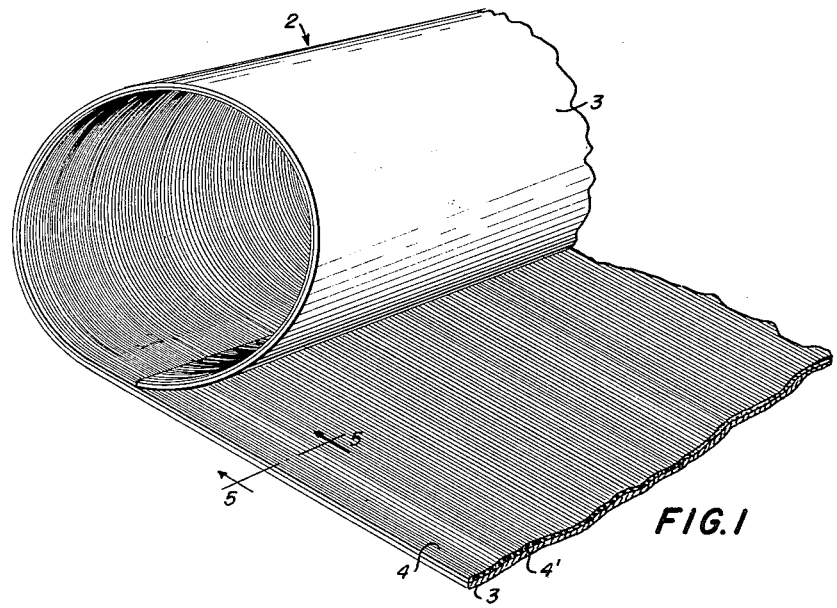
FIGURE 1 is a perspective view of a partially formed tubular article made in accordance with the instant invention.

A preferred embodiment of the instant invention may be practiced by taking relatively thin gauge metal sheets such as steel sheets on the order of .004" in thickness or less or thin aluminum sheet on the order of from .040 to .0625" in thickness or aluminum foil on the order of .0059" thickness or less and securing one or more layers of fiberglass yarn or strands thereto. In one embodiment of the invention and in order to secure the fiberglass strands, yarn, etc. to the metal sheets, it is contemplated that the metal strip may be coated with a suitable uncured resin in a tacky state and the yarn applied to the tacky surface thereof. During such application the yarn also becomes impregnated with the resin. The thin steel or aluminum foil or sheets advantageously serve as carriers for the fiberglass and when the composite fiberglass and metal sheets are slit into strips of various sizes and lengths, the resultant strips can thereafter be either convolutely or spirally wound into tubular members on existing winding equipment. Because of the incorporation of the fiberglass with the thin metal, the resultant tubular articles will be exceptionally strong and have a wide variety of uses such as in the manufacture of high pressure pipe or rocket motor bodies.

In a further preferred embodiment of the invention the resinous materials employed to secure the fiberglass to the metal sheets are suitable thermosetting resins. They may also be of the types described in my copending application Serial No. 406,167 filed January 26, 1954, now Patent No. 2,854,031. Thus the resins employed as an adhesive and/or binder for the fiberglass threads or yarn are preferably contact uncured resins of the thermosetting type, which can be dissolved in acetone or other solvents. Such uncured resins are preferably either crystalline in structure so as to be ground up into fine particles or in the form of a powder to insure good physical distribution. Two such resins with which particular success has been obtained is "G-382," a polyfumarate made by the Atlas Powder Company used separately or in combination with diallyl phthalate made and distributed by the Shell Chemical Company. Two other resins which are acceptable for this same use are "Epon" series made by the Shell Chemical Company as well as certain resins made by the Ciba Corporation under the name "Araldite" both of which are of the epoxylene series. Certain phenolics may also be used advantageously such as #101 produced by Ironsides Resins, Inc., or others. In general, the resins are preferably of the low pressure or "contact" type which may be set without the necessity of high pressure. The "low temperature" resins which set at substantially room temperature are not as desirable as those requiring higher temperatures for curing because of their lower final strength and resistance to distortion by heat. Various epoxy furane combinations may also be used. In the case of where aluminum sheet or foil is employed as the metal carrier sheet, epoxy resins or phenolic combinations are preferred because they have an excellent adhesion to aluminum. In this case the aluminum itself should also be thoroughly cleaned and etched prior to coating and the laying on of the yarn by means of the resinous material. Since the fiberglass is secured in place on the metal sheets by means of the resin, the tackiness of the resin should also be such that the fiberglass will remain in contact with the metal during winding of the composite metal and fiberglass strip and until it is firmly anchored in place by heating and curing of the resin. During curing the metal strip or strips also advantageously act as a built in mold for the fiberglass and resin layer or layers.

The incorporation of the fiberglass threads or strands with the thin metal strips in a finished tube formed therefrom also provides substantially higher tensile strength values and hoop stress values than can be otherwise obtained by the use of metal alone. When metal, which is an isotropic material with equal strength in all directions, is combined in the manner proposed herein with fiberglass, a unidirectional material with all of its strength in one direction, the two materials in selected numbers of plies will yield the desired result as to strength distribution. Thus, if an equal number of plies of metal strip is employed with the impregnated fiberglass yarns or strips in a tube winding, the physical values depending upon the angles of winding can be made to balance out to twice as much strength in the hoop direction as in the axial direction, which is essential for various high pressure tubular articles such as rocket motor bodies or high pressure pipe. The added advantages of such a combination include a higher strength-weight ratio than can be obtained by using metallic strips such as aluminum sheet, aluminum foil or steel strips. The foil or steel also provides for non-porosity in the resultant structure and it is possible to machine or press the fiberglass threads into the metal strips, which is something that cannot readily be done with all reinforced plastic structures.

If the fiberglass threads, strands, tape or yarns are laid on the metal tape when the tape is coated, i.e., if the metal tape is used as a carrier, the materials are combined in a unique manner and are ready to be rolled or wound. When metallic strips or tapes have fiberglass tapes or strands adhered thereto in the manner proposed, it is also possible to employ standard convolute or spiral paper tube winding equipment for winding the same. Such equipment requires a certain degree of rigidity in the tube to permit its ejection from the mandrel. With a metal and fiberglass winding combination, this is possible. On the other hand, the use of such tube winders with pre-impregnated fiberglass materials alone is extremely difficult due to the flexibility of the fiberglass. Although the fiberglass may be applied to metal tapes as described above, it is conceivable that the fiberglass may have been previously incorporated with a fibrous material such as paper impregnated with a thermosetting material of the types noted above, and with the thermosetting material being in a tacky state at the time the metal and fiberglass fibrous combination are bound together and wound into a composite metal, fiberglass and paper sheet or strip. In this case coating of the metal strip with a resin may be dispensed with.

Figure 2:
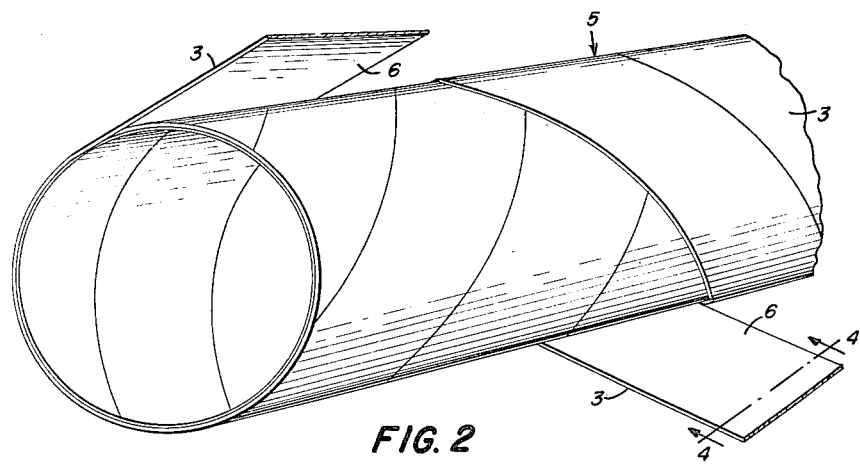
FIGURE 2 is a view similar to FIGURE 1 wherein the tubular article is formed from one or more spiral wrappings.

Bearing the aforesaid points in mind, attention is now directed to the various figures of the drawings. In FIGURE 1, a partially wrapped tubular member 2 is disclosed. The tubular member is formed in any suitable fashion on a conventional paper tube winding machine from a strip of thin metal such as steel, thin aluminum sheets or aluminum foil 3 of the gauges noted above to which has been previously bound by a suitable thermosetting resin 4' a layer of reinforcing strands or yarns of fiberglass 4. Although as indicated in FIGURE 1 the individual fiberglass strands are shown as being disposed lengthwise to the strip, these strands may also be located cross-wise to the strip, i.e., parallel to the short dimensions of the composite strip. Also, instead of using the one layer of fiberglass strands, shown in FIGURE 5, several such layers may be used depending on the results desired. Finally, instead of forming the tube by the use of convolute windings as indicated in FIGURE 1, a tube 5 as indicated in FIGURE 2, may be formed by spirally winding a composite metal and fiberglass strip about itself. In this case care should also be exercised in either properly butting or overlapping the individual wraps. When overlaps are used the amounts and types of overlaps will in turn depend upon the results desired and they may be of the type referred to in my copending application Serial No. 406,167 filed January 26, 1954, now Patent No. 2,854,031.

Where two or more laminated metal and fiberglass strips are employed in making the tube shown in FIGURE 2, adjacent separate strips may be spirally wound in opposite directions to each other to provide for greater strength. For the same reason, the first several composite strips may be both wrapped in the same direction and the next several strips wrapped in the opposite direction. In short, it will be obvious that depending upon the results desired, the strips may be wrapped in a variety of ways with respect to each other. This in turn will depend to some extent on the diameter of the tube being formed and the width of the tapes used therefor.

In the case of the composite strips shown in FIGURES 1 and 2, the fiberglass may also be applied to the metallic strip not only in the form of individual strands or threads but also as a composite fiberglass and plastic impregnated paper tape 6 in the manner indicated in FIGURE 4; the tape 6 having been previously impregnated with a suitable thermosetting resin 4' such as those of the epoxylene type and the resin 4' being in a tacky condition at the time the tape 6 is applied to the metal 3.

FIGURE 3 discloses a further modified tube construction which can be made according to the instant invention. In this instance the tube 2 is made up of an inner tubular layer comprised of one or more windings or wrapping of a thermosetting resin impregnated fiberglass tape 8, the resin in turn being in a tacky condition. After the resin impregnated fiberglass tape 8 has been wrapped into a tube-like member one or more thin strips of metal such as thin strips of steel 9 or the like are convolutely or spirally wrapped about the previously formed fiberglass tape tube. Finally the steel wrapping may be covered by one or more wrappings 10 of fiberglass asbestos; fiberglass paper; or other thermosetting resin impregnated material to prevent corrosion. Thereafter the completed tubular article is subjected to heat for a time sufficient to cure the resinous materials in layers 8 and 10. During heating and setting of the resinous materials, the steel strips advantageously act as a built in mold form for curing the various resin impregnated layers and in particular the inner fiberglass layer 8. It is also to be noted that the metal strip 9 may be incorporated in a variety of ways in a tube of the type shown in FIGURE 3 for the purpose of acting as a mold during curing of the resinous materials therein and as tube reinforcements. For example, the first several layers of the tube may be made from the tape 6 and resin material 4' as shown in FIGURE 4. There can then be several windings of one or more steel tapes 9 followed by successive winding of additional tapes 6 and metal tapes 9 in alternate or several successive layers each. In short, the interspersion of the metal tapes with the fiberglass reinforced tapes 6 or the like during the building of the tube may be done in a wide variety of ways depending on the results desired and the materials used. In any event the resinous material employed to hold the metal and fiberglass together during the winding and forming of any tubes will securely bond the same together after the resin is heated and cured.

The term fiberglass as used in the claims is intended to cover fiberglass when used either as individual strands, threads, yarns or tapes alone or in combination with fibrous carriers, such as paper.

It is also obvious that various changes and modifications may be made in the instant invention without departing from the spirit and scope thereof as defined by the appended claims wherein.

I claim:

1. A rigid, walled tube comprising a plurality of laminations, at least one of which embodies a metal foil strip having adhered thereto individual strands of fiberglass, all of which strands are unidirectional and in closely spaced parallel relation to one another, and a cured thermosetting resin permanently bonding said unidirectional strands to the metal strip and all other laminations to one another to produce a rigid tube.

2. A rigid, walled tube according to claim 1, comprising at least one lamination of fibrous material.

References Cited in the file of this patent

UNITED STATES PATENTS

| | | |
|---|---|---|
| 2,047,778 | Hayden | July 14, 1936 |
| 2,354,556 | Stahl | July 25, 1944 |
| 2,605,202 | Reynolds | July 29, 1952 |
| 2,653,887 | Slayter | Sept. 29, 1953 |
| 2,698,991 | Mesick | Jan. 11, 1955 |
| 2,723,705 | Collins | Nov. 15, 1955 |
| 2,750,314 | Benmels | June 12, 1956 |
| 2,766,920 | Rawley | Oct. 16, 1956 |
| 2,783,173 | Walker et al. | Feb. 26, 1957 |
| 2,805,974 | Brucker | Sept. 10, 1957 |
| 2,858,854 | Daggett | Nov. 4, 1958 |
| 2,884,010 | Fischer | Apr. 28, 1959 |
| 2,932,597 | St. John et al. | Apr. 12, 1960 |
| 2,952,579 | Merriman | Sept. 13, 1960 |

FOREIGN PATENTS

| | | |
|---|---|---|
| 1,142,436 | France | Apr. 1, 1957 |